United States Patent
Sreeramoju (10) Patent No.: US 9,503,362 B2
(45) Date of Patent: Nov. 22, 2016

(54) REVERSE PATH MAXIMUM TRANSMISSION UNIT (PMTU) DISCOVERY

(71) Applicant: VMware, Inc., Palo Alto, CA (US)

(72) Inventor: Akshay Kumar Sreeramoju, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 143 days.

(21) Appl. No.: 14/591,831

(22) Filed: Jan. 7, 2015

(65) Prior Publication Data

US 2016/0197823 A1    Jul. 7, 2016

(51) Int. Cl.
*H04L 12/805* (2013.01)
*H04L 12/721* (2013.01)
*H04L 29/06* (2006.01)

(52) U.S. Cl.
CPC ............ *H04L 45/36* (2013.01); *H04L 45/26* (2013.01); *H04L 47/36* (2013.01); *H04L 69/166* (2013.01)

(58) Field of Classification Search
CPC ... H04L 47/36; H04L 47/365; H04L 69/166; H04L 29/06136
See application file for complete search history.

(56) References Cited

U.S. PATENT DOCUMENTS

| | | | | |
|---|---|---|---|---|
| 6,975,647 B2 * | 12/2005 | Neale | ................ | H04B 7/18582 370/316 |
| 7,505,484 B2 * | 3/2009 | Pancholi | ............... | H04L 69/166 370/470 |
| 7,542,471 B2 * | 6/2009 | Samuels | ................ | H04L 69/16 370/392 |
| 7,969,876 B2 * | 6/2011 | Samuels | ................ | H04L 69/16 370/230 |
| 7,995,478 B2 * | 8/2011 | Takeda | ................ | H04L 12/2697 370/235 |
| 2003/0187975 A1 * | 10/2003 | Brown | ................ | H04L 47/10 709/224 |
| 2005/0025185 A1 * | 2/2005 | Brown | ................ | H04L 29/06 370/474 |
| 2005/0281288 A1 * | 12/2005 | Banerjee | ................ | H04L 47/10 370/477 |
| 2006/0018315 A1 * | 1/2006 | Baratakke | ............... | H04L 69/16 370/389 |
| 2014/0233565 A1 * | 8/2014 | Mahapatra | ............ | H04L 69/166 370/392 |
| 2015/0117452 A1 * | 4/2015 | Mosko | ................ | H04L 47/365 370/392 |
| 2015/0341278 A1 * | 11/2015 | Sundar | ................ | H04L 47/365 370/392 |
| 2015/0381509 A1 * | 12/2015 | Sreeramoju | ........... | H04L 47/365 370/252 |
| 2016/0164794 A1 * | 6/2016 | Ramalingam | ......... | H04L 47/365 370/235 |

FOREIGN PATENT DOCUMENTS

CN          102469016 A  *  5/2012   ............ H04L 29/12

OTHER PUBLICATIONS

Liu, Machine Translation (Google) of CN 102469016 A1, May 23, 2012, translated on Jul. 21, 2016, 7 pages.*

* cited by examiner

*Primary Examiner* — Hoon J Chung
(74) *Attorney, Agent, or Firm* — Su IP Consulting (57) ABSTRACT

An example method is provided for a first device to perform reverse path maximum transmission unit (PMTU) discovery in a communications network. The method may comprise receiving multiple fragments of a packet sent by a second device via a path from the second device to the first device in the communications network. Based on the received fragments, a reverse PMTU that represents an estimate of a PMTU of the path from the second device to the first device may be determined. The method may further comprise configuring a message that includes data relating to the reverse PMTU and sending, to the second device, the message to inform the second device to size packets for transmission from the second device to the first device based on the data relating to the reverse PMTU.

20 Claims, 6 Drawing Sheets

| Source Port 310 | | | | | | | | | Destination Port 315 |
|---|---|---|---|---|---|---|---|---|---|
| Sequence Number 320 |||||||||  |
| Acknowledgement Number (if ACK = 1) 325 |||||||||  |
| Data Offset 330 | Reserved 335 | N S | C W E | E C E | U R G | A C K | P S H | S Y N | F I N | Window Size 350 |
| Checksum 355    345  340 ||||||||| Urgent Pointer (if URG = 1) 360 |
| Options 365<br>(including MSS relating to reverse PMTU when SYN = 1)<br>370 |||||||||  |
| Payload 375 |||||||||  |

REVERSE PATH MAXIMUM TRANSMISSION UNIT (PMTU) DISCOVERY

BACKGROUND

Unless otherwise indicated herein, known approaches described are not admitted to be prior art by inclusion throughout the present disclosure.

Communications networks are generally packet-switched networks that operate based on Internet Protocol (IP). When a source device has a large amount of data to send to a destination device, the data may be transmitted as a series of packets via one or more intermediate devices along a path between the source device and the destination device. Path maximum transmission unit (PMTU) is the maximum size of a packet that can be transmitted from the source device to the destination device without requiring fragmentation. Any packet that is larger than the PMTU is generally fragmented or discarded.

Packet fragmentation and reassembly is generally undesirable because it unnecessarily wastes processing and network resources. Fragmenting a packet generally involves dividing the packet into smaller fragments, which causes more overhead for the destination device to wait until all fragments are received and to reassemble the fragments. Also, since each fragment generally has the same header overhead as the original message, the total number of bytes that needs to be transmitted increases. This may in turn slow the transmission down and adversely affect any guaranteed quality of service (QoS).

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

To avoid or reduce the likelihood of packet fragmentation, a source device may perform path maximum transmission unit (PMTU) discovery to determine the PMTU of a path via which packets may be sent from the source device to the destination device. Since the PMTU sets out the maximum transmission unit of the path, the source device may then size packets for transmission to a destination device accordingly. As will be explained with reference to FIG. 1, existing PMTU discovery approaches present a number of practical challenges because they generally depend on intermediate devices and/or require a number of packet round trips.

Figure 1:
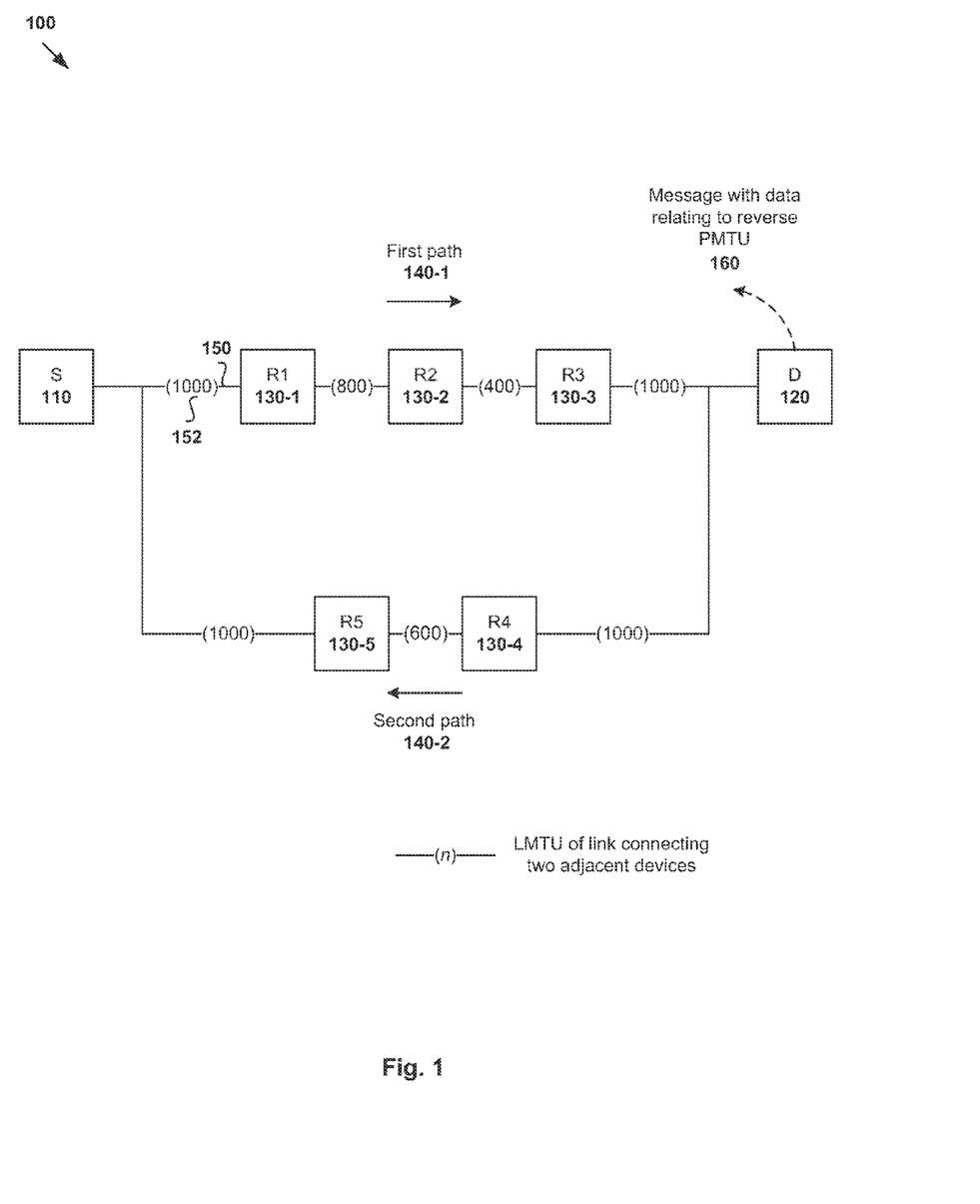
FIG. 1 is a schematic diagram of an example communications network environment.

In more detail, FIG. 1 is a schematic diagram of example communications network environment 100. Although an example is shown, it will be appreciated that network environment 100 may include additional or alternative components. In the example shown, network environment 100 includes source device 110 (e.g., "S") and destination device 120 (e.g., "D") communicating via multiple intermediate devices 130-1 to 130-5 (e.g., "R1", "R2", "R3", "R4" and "R5"). Intermediate devices 130-1 to 130-4 will be collectively referred to as "intermediate devices 130" or individually as a general "intermediate device 130."

Network environment 100 may be any suitable network, such as wide area network (e.g., Internet), virtual private network, virtualized computing network, etc. Source device 110, destination device 120 and intermediate devices 130 may be any suitable physical or virtual entity. In practice, source device 110 and destination device 120 may be endpoint devices (e.g., hosts), while intermediate devices 130 may be network layer routers, etc. Source device 110 and destination device 120 may also be referred to as the sending endpoint (SEP) device and receiving endpoint (REP) device, respectively.

Intermediate devices 130-1 to 130-5 form paths via which source device 110 and destination device 120 may communicate. In the example in FIG. 1, source device 110 may send packets to destination device 120 via "first path" 140-1 formed by R1, R2 and R3. In the case of symmetric routing, first path 140-1 may also be used by destination device 120 to send packets to source device 110. However, due to path or routing asymmetry in the example in FIG. 1, "second path" 140-2 formed by R4 and R5 is used by destination device 120 to send packets to source device 110. First path 140-1 and second path 140-2 will be collectively referred to as "paths 140" or individually as "path 140."

The term "PMTU" may refer to the maximum packet size that can be sent from source device 110 to destination device 120 without requiring fragmentation by any intermediate device 130 (e.g., R1, R2 and R3). For example, the PMTU may be computed as the minimum link MTU (LMTU) 152 along first path 140-1. For source device 110, LMTU 152 (shown in brackets) of link 150 between source device 110 and R1 may be represented as LMTU(S, R1)=1000 bytes, which is the maximum packet size allowed by link 150 without requiring fragmentation.

For other links 150 along first path 140-1 in FIG. 1, LMTU(R1, R2)=800 bytes, LMTU(R2, R3)=400 bytes, and LMTU(R3, D)=1000 bytes. The PMTU of first path 140-1 is the minimum LMTU, i.e., PMTU(S, D)=minimum(LMTU (S, R1), LMTU(R1, R2), LMTU(R2, R3), LMTU(R3, D))=LMTU(R2, R3)=400 bytes. Similarly, for second path 140-2 from destination device 120 to source device 110, LMTU(D, R4)=1000 bytes, LMTU(R4, R5)=600 bytes and LMTU(R5, S)=1000 bytes. The PMTU of second path 140-2 is the minimum LMTU, i.e., PMTU(D, S)=minimum (LMTU(D, R4), LMTU(R4, R5), LMTU(R5, S))=LMTU (R4, R5)=600 bytes.

In the example in FIG. 1, when source device 110 sends packets to destination device 120 via first path 140-1, the size of the packets may not exceed PMTU(S, D)=400 bytes to avoid fragmentation and reassembly. Similarly, packets for transmission from destination device 120 to source device 110 over second path 140-2 should not exceed PMTU(D, S)=600 bytes. Otherwise, fragmentation would be required (e.g., at R4). As can be seen, PMTU(S, D) and PMTU(D, S) may be different due to path or routing asymmetry.

Conventionally, source device 110 performs PMTU discovery to learn the PMTU of first path 140-1 to size its packets accordingly. During PMTU discovery, source device 110 may have to dynamically probe for PMTU changes by strategically sending packets that are larger in size than the PMTU. The packets carry a "Do not fragment" (DF) flag that is set to prevent fragmentation along first path 140-1. When a packet with its DF flag set is received, intermediate device 130 (e.g., R1) drops the packet and sends an error message to source device 110 if the size of the packet exceeds the next hop LMTU (e.g., LMTU(R1, R2)=800 bytes). The error message is generally an Internet Control Message Protocol (ICMP) "Fragmentation Needed" (type 3, code 4) message that enables source device 110 to learn that fragmentation is required and adjust its estimated PMTU accordingly.

Due to various reasons (e.g., security and administrative reasons, etc.), not all intermediate devices 130 are cooperative during PMTU discovery. Instead of responding with "Fragmentation Needed" messages, intermediate devices 130 may simply discard the packets that require fragmentation, or ignore the DF flag and fragment the packets (e.g., to avoid exposing themselves). This not only increases the rate of packet loss and retransmission, but may prevent source device 110 from adjusting its estimated PMTU accordingly. As such, PMTU discovery approaches that merely rely on setting the DF flag and/or cooperation from intermediate devices 130 are not reliably effective. Further, even when intermediate devices 130 are cooperative, source device 110 may require several round trips of non-optimally sized packets to learn the PMTU of first path 140-1 (e.g., PMTU(S, D)=400 bytes). This adversely affects network performance, such as reducing throughput in high latency networks.

According to examples of the present disclosure, instead of merely relying on source device 110 to perform PMTU discovery based on "Fragmentation Needed" messages from cooperative intermediate devices 130, destination device 120 may determine an estimate of the PMTU of first path 140-1 based on fragments received from source device 110. The process of destination device 120 estimating the PMTU of first path 140-1 may be taken as the reverse or opposite of conventional PMTU discovery performed by source device 110.

Throughout the present specification, this reverse process will be referred to as "reverse PMTU discovery". The term "reverse PMTU" of first path 140-1 may refer generally to an estimate of the PMTU of first path 140-1 by destination device 120. Destination device 120 may send a message (see 160 in FIG. 1) to inform source device 110 to size the latter's packets accordingly.

Figure 2:
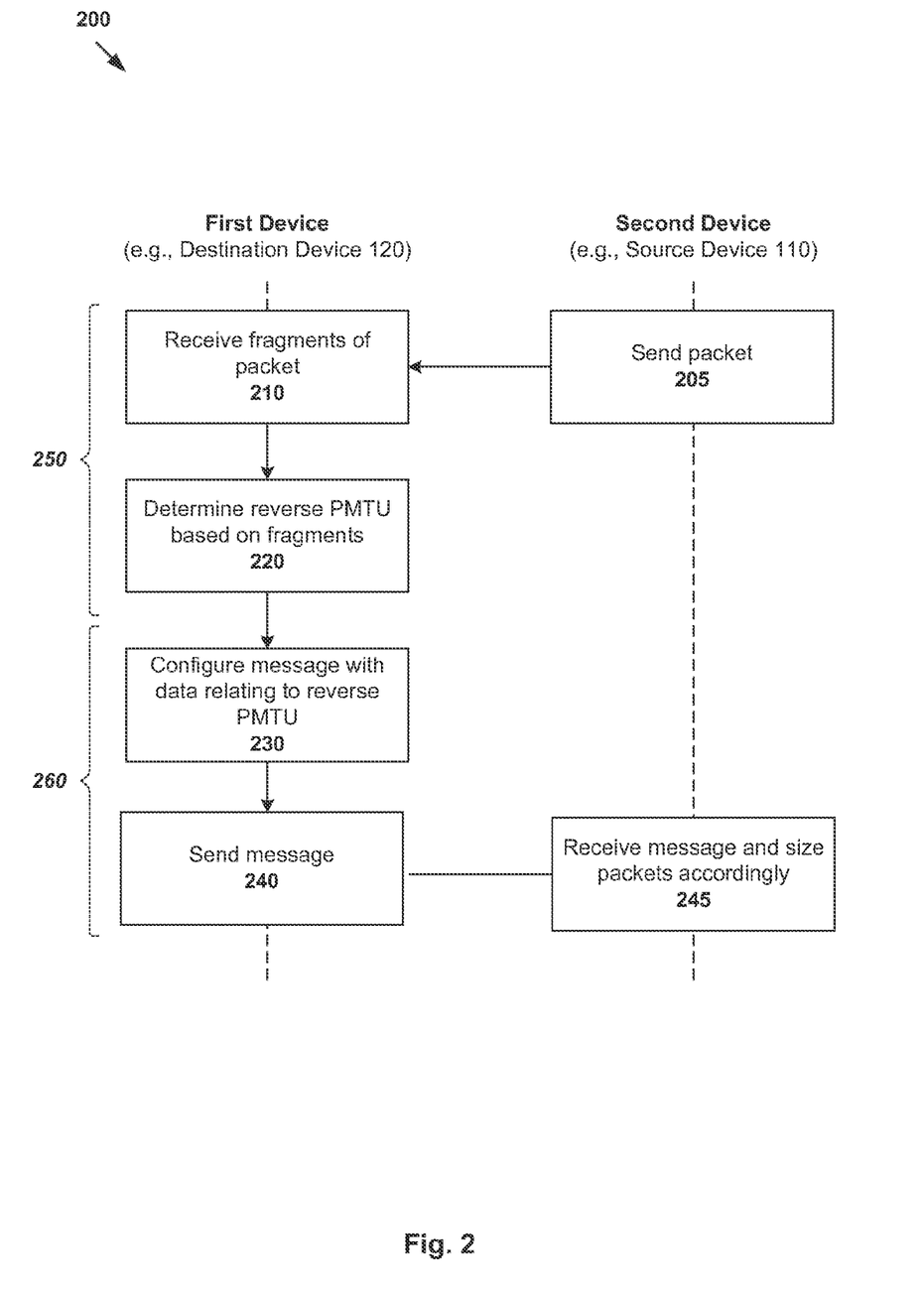
FIG. 2 is a flow chart of an example process for reverse PMTU discovery.

In more detail, FIG. 2 is a flow chart of an example process 200 for reverse PMTU discovery. Example process 200 may include one or more operations, functions, or actions illustrated by one or more blocks, such as blocks 205 to 245. The various blocks may be combined into fewer blocks, divided into additional blocks, and/or eliminated based upon the desired implementation.

At blocks 205 and 210 in FIG. 2, destination device 120 (an example of "first device") receives multiple fragments of a packet via path 140 (e.g., first path 140-1) from source device 110 (an example of "second device"). The fragments received by destination device 120 generally indicate that fragmentation has occurred over first path 140-1. For example, based on an Internet Protocol (IP) header of a fragment, destination device 120 may learn that fragmentation has occurred (e.g., "flags" field in the IP header), the fragment's position within a packet (e.g., "fragment offset" field) and the fragment's unique identification value (e.g., "identification" field).

At block 220 in FIG. 2, destination device 120 determines a reverse PMTU based on the received fragments. The reverse PMTU represents destination device's 120 estimate of the PMTU of path 140 (e.g., first path 140-1) from source device 110 to destination device 120. The reverse PMTU may be determined as the largest fragment size of the received fragments. In practice, destination device 120 may store (e.g., cache) the largest fragment size received from source device 110 over a period of time in order to determine the reverse PMTU. In the following examples, the reverse PMTU determined by destination device 120 for first path 140-1 may be represented as RPMTU(D, S)=PMTU(S, D)=400 bytes, where "RPMTU" corresponds to reverse PMTU.

At block 230 in FIG. 2, destination device 120 configures message 160 that includes data relating to the reverse PMTU. At block 240, destination device 120 sends message 160 to inform source device 110 to size packets for transmission from source device 110 to destination device 120 based on the data relating to the reverse PMTU. See also 245 in FIG. 2.

Message 160 may be any suitable message configured and sent by destination device 120 at any suitable time to inform source device 110 to size its packets. It is not necessary for message 160 to be configured and sent in real time, such as immediately after block 210 or 220. For example, message 160 may be a session establishment message that is sent by destination device 120 to establish a new connection-oriented session with source device 110. In this example, blocks 210 and 220 may be implemented during one session (e.g., "first" session; see 250), while blocks 230 and 240 during the establishment of a new session (e.g., "second" session; see 260). When Transport Control Protocol (TCP) is in use, the session establishment message may be a Synchronize (SYN) packet with data in the form of a Maximum Segment Size (MSS) parameter relating to the reverse PMTU. Any other suitable communication protocol may be used, such as a TCP Fast Open extension that speeds up the opening of successive connections between two devices. Example process 200 may be used in any suitable application, such as to facilitate packet transmission for applications that require high throughput.

Using example process 200, it is not necessary to rely on "Fragmentation Needed" messages from intermediate devices 130 to estimate the PMTU for first path 140-1. Instead, destination device 120 may rely on its knowledge of packet fragmentation that occurs along first path 140-1 based on the received fragments. Sending message 160 allows destination device 120 to share its knowledge with source device 110 to avoid or reduce the likelihood of fragmentation in subsequent communication. In some examples, message 160 may be referred to as a "synchronization message" that allows destination device 120 to inform source device 110 to size its packets accordingly. This in turn helps to improve network throughput, reduce packet loss, maintain connectivity and reduce the need for buffering at intermediate devices 130 and destination device 120 due to fragmentation.

Although the above example refers to the reverse PMTU of first path 140-1, example process 200 may also be implemented by source device 110. For example, in the case of asymmetric routing, the PMTU of first path 140-1 (i.e., 400 bytes) is different to that of second path 140-2 (i.e., 600 bytes). Using example process 200, source device 110 may determine a reverse PMTU that represents an estimate of the PMTU of second path 140-2 based on fragments of a packet sent by destination device 120. In the following examples, the reverse PMTU determined by source device 110 for second path 140-2 may be represented as RPMTU(S, D)=PMTU(D, S)=600 bytes, where "RPMTU" corresponds to reverse PMTU. Source device 110 may then send message 160 to inform destination device 120 to size packets for transmission to source device 110 accordingly.

As example process 200 does not require any new operations, functions or actions by intermediate devices 130, example process 200 may be implemented without necessitating any changes (e.g., software and/or hardware) at intermediate devices 130. This means intermediate devices 130 do not have to be updated or replaced, which reduces the implementation costs because there are usually many intermediate devices 130 connecting source device 110 destination device 120. Similarly, example process 200 may be implemented by destination device 120 to communicate with existing source device 110. Source device 110 only needs to be updated or replaced if source device 110 also implements reverse PMTU discovery.

In the following, example message 160 will be discussed with reference to FIG. 3. Further, example reverse PMTU discovery performed by destination device 120 and source device 110 will be discussed with reference to FIG. 4 and FIG. 5, respectively. Example reverse PMTU discovery based on TCP Fast Open will be discussed with reference to FIG. 6.

Example Message 160

Figure 3:
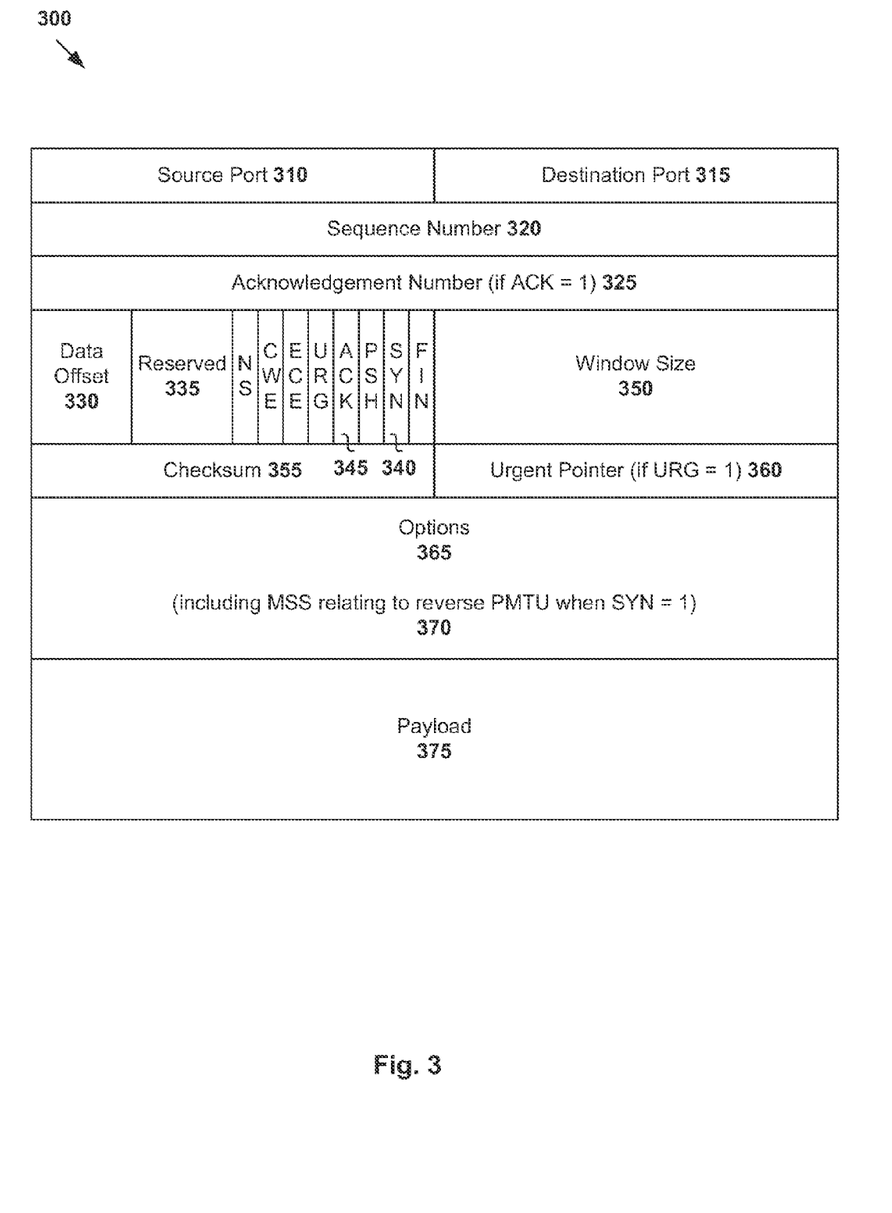
FIG. 3 is a schematic diagram of an example format for a message for reverse PMTU discovery.

FIG. 3 is a schematic diagram of example format 300 of message 160. In this example, message 160 is a session establishment message for establishing a connection-oriented session between destination device 120 and source device 110. For example, TCP relies on a three-way handshake to establish a connection over an IP network. The three-way handshake is designed such that two devices attempting to communicate may negotiate the parameters of the connection before data is transmitted. Although TCP is used as an example in FIG. 3, message 160 may have alternative or additional fields and configuration.

The three-way handshake process generally includes the transmission of (1) a SYN packet, (2) a synchronize-acknowledgement (SYN-ACK) packet and finally (3) an ACK packet. For example, destination device 120 may send a SYN packet to source device 110 to initiate the establishment of a TCP session. Source device 110 may then respond with a SYN-ACK packet. Finally, destination device 120 may send an ACK packet to source device 110 to complete the establishment.

In the example in FIG. 3, example format 300 includes suitable header information, such as source port 310, destination port 315, sequence number 320, acknowledgement number 325, data offset 330, reserved field 335, various flags (e.g., SYN flag 340 and ACK flag 345), window size 350, checksum 355, urgent pointer 360, and options 365. Payload information 370 follows the header information. To facilitate the handshake process, a SYN packet may be configured by setting SYN flag 340 (i.e., SYN=1), a SYN-ACK packet by setting both SYN flag 340 and ACK flag 345 (i.e., SYN=1 and ACK=1) and an ACK packet by setting ACK flag 345 (i.e., ACK=1).

According to example process 200, the SYN packet sent during the handshake process may be used as message 160 according to blocks 230 and 240 in FIG. 2. When SYN flag 340 is set, options field 365 may include a Maximum Segment Size (MSS) parameter 370 that specifies (e.g., in bytes) the largest amount of data that a device is willing to receive in a single segment. Conventionally, MSS parameter 370 is generally set as the next hop LMTU of the sender of the SYN packet (e.g., LMTU(D, R4)=1000 bytes). As will be described in using FIG. 4 and FIG. 5, MSS parameter 370 may be set according to example process 200 based on the reverse PMTU determined at block 230 in FIG. 2.

Reverse PMTU Discovery by Destination Device

Figure 4:
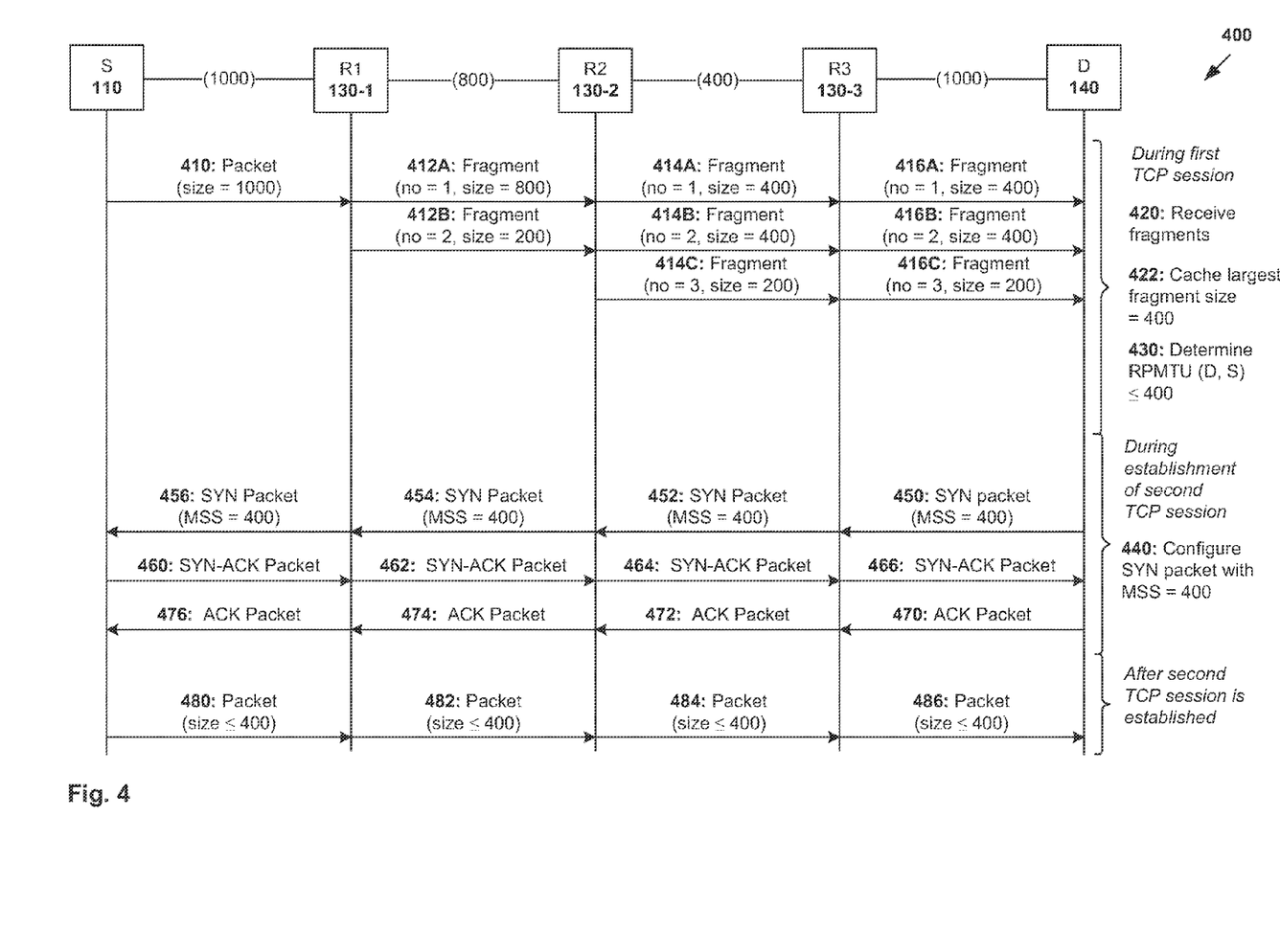
FIG. 4 is a flow diagram illustrating example communication in the example network environment in FIG. 1 when the example process in FIG. 2 is implemented by a destination device.

FIG. 4 is a flow diagram illustrating example communication 400 in example network environment 100 in FIG. 1 when example process 200 in FIG. 2 is implemented by destination device 120. In this example, the implementation is illustrated using one or more operations, functions, or actions represented by 410 to 486. The various operations, functions, or actions may be combined, divided, and/or eliminated based upon the desired implementation. In the example in FIGS. 4, 410 to 430 may be implemented during one session (e.g., an earlier "first TCP session"); 440 to 476 during the establishment of another session (e.g., a later "second TCP session"); and 480 to 486 after the session establishment is completed. In practice, any other suitable implementation may be used, such as performing 410 to 486 over a single session, or during additional and/or alternative session, provided it is supported by the protocol used.

At 410 to 416C in FIG. 4 (related to block 205 in FIG. 2), source device 110 sends packets to destination device 120 via intermediate devices 130 (i.e., R1, R2 and R3) along first path 140-1. The packets (one indicated for simplicity) may be sent from source device 110 to destination device 120 for any suitable purpose. For example, the packets may be any packets whose DF flag is not set to allow fragmentation (e.g., User Datagram Protocol (UDP) datagrams, Internet Control Message Protocol (ICMP) packets, etc.). The DF flag is generally set for TCP packets, but in some applications, destination device 120 may rely on the TCP packets if their DF flag is not set.

In the example in FIG. 4, fragmentation is required at R1 because the size of the packet (i.e., 1000 bytes) is greater than the next hop LMTU (i.e., LMTU(R1, R2)=800 bytes). R1 fragments each packet 410 into two fragments not exceeding 800 bytes each, i.e., first fragment 412A (fragment number n=1, size=800 bytes) and second fragment 412B (n=2, size=200 bytes).

At R2, further fragmentation is required because the size of the largest fragment (i.e., 800 bytes) is greater than the next hop LMTU (i.e., LMTU(R2, R3)=400 bytes). R2 performs fragmentation and sends three fragments to R2, i.e., first fragment 414A (n=1, size=400 bytes), second fragment 414B (n=2, size=400 bytes) and third fragment 414C (n=3, size=200 bytes). At R3, further fragmentation is not required because the size of each fragment is less than the next hop LMTU (i.e., LMTU(R3, D)=1000 bytes). At 416A, 416B and 416C, R3 sends the three fragments to destination device 120.

At 420 in FIG. 4 (related to block 210 in FIG. 2), destination device 120 receives three fragments from R3. Next, at 422, destination device 120 may determine and cache (e.g., every one hour, etc.) the largest fragment size based on the received fragments (i.e., largest fragment with n=1, size=400 bytes). For example, by examining an IP header of each fragment, destination device 120 may determine the largest fragment size (e.g., the size of the first fragment with fragment offset=0). Destination device 120 may continue to receive further packets and/or fragments from source device 110 over a suitable period of time (e.g., one hour, etc.) to update the cached largest fragment size.

At 430 in FIG. 4 (related to block 220 in FIG. 2), destination device 120 determines a reverse PMTU for first path 140-1 based on the received fragments. For example, the reverse PMTU may be determined as less than or equal to the cached largest fragment size (e.g., RPMTU(D, S)=400 bytes).

At 440 in FIG. 4 (related to block 230 in FIG. 2), destination device 120 configures message 160, such as during the establishment of a connection-oriented session with source device 110 (e.g., second TCP session in FIG. 4). In the case of TCP, destination device 120 may configure a SYN packet (i.e., SYN flag=1 in FIG. 3) that includes an MSS parameter relating to the reverse PMTU. In the example in FIG. 4, the MSS parameter is set to MSS=RPMTU(D, S)=400 bytes, which is also the PMTU of first path 140-1.

At 450 to 456 in FIG. 4 (related to block 240 in FIG. 2) destination device 120 sends notification message 160 (e.g., SYN packet) to source device 110. The SYN packet is to inform source device 110 to size any packets for transmission to destination device based on the MSS parameter (i.e., 400 bytes). As part of the three-way handshake process, source device 110 responds with a SYN-ACK packet (see 460 to 466 in FIG. 4) and destination device 120 with an ACK packet (see 470 to 476 in FIG. 4) to complete the session establishment. Using the SYN packet, destination device 120 may impose appropriate PMTU restriction on source device 110 even before source device 110 sends any data and without the cognizance of source device 110.

At 480 to 486 in FIG. 4, after the TCP session is established, source device 110 sends packets that are sized less than or equal to the MSS parameter (i.e., 400 bytes). This is to avoid or reduce the likelihood of fragmentation and related loss or delay at intermediate devices R1, R2 and R3, which forward the packets to destination device 120. As such, the quality of service (QoS) of the transmission may be improved, for example due to reduced transmission time via R1 to R3 (since fragmentation is not required). At destination device 120, any overhead associated with the reassembly of fragments may also be reduced, if not avoided, to speed up packet processing.

Referring to 422 and 430 again, the reverse PMTU may be updated from time to time (e.g., hourly) to adapt to any real-time network path or routing changes. For example, destination device 120 may continue to update any cached largest fragment size based on further packets and/or fragments from source device 110. The updated cached size of the largest fragment may then be used to determine an updated reverse PMTU for subsequent communication (e.g., new TCP session).

In the above example, the reverse PMTU may also be set to less than the size of the largest fragment (e.g., RPMTU(D, S)=300 bytes<PMTU(S, D)=400 bytes). For example, this may occur if the cached value (e.g., 300 bytes) is obsolete and is not reflecting a new larger PMTU(S, D) due to a change in intermediate devices 130. Since the MSS parameter is a hard boundary, source device 110 will send smaller packets than its PMTU (e.g., PMTU(S, D)=400 bytes). Although less than ideal, this situation would not be catastrophic because TCP generally tries to converge to a certain throughput rather than "packet-put." Also, since the reverse PMTU determined by destination device 120 may be updated periodically (e.g., hourly) based on changes to the cached largest fragment size, any sub-optimal throughput or performance would not be long lasting.

Although not shown in FIG. 4, the reverse PMTU determined by destination device 120 may also be greater than the PMTU of first path 140-1 (i.e., RPMTU(D, S)=600 bytes>PMTU(S, D)=400 bytes). For example, this situation might arise if first path 140-1 has changed since the reverse PMTU was last calculated based on cached values. In this case, destination device 120 may still receive fragments from source device 110 if packets are sized more than PMTU(S, D)=400 bytes. Since the cached largest fragment size is updated periodically, destination device 120 may also update the reverse PMTU accordingly to reduce the likelihood of fragmentation in a subsequent session. In the meantime, the PMTU discovery performed by source device 110 may help identify PMTU(S, D)=400 bytes, in which case source device 110 may reduce the size of the packets for transmission to destination device 120.

Reverse PMTU Discovery by Source Device

In the example in FIG. 1, the PMTU of first path 140-1 is different to the PMTU of second path 140-2 due to asymmetry in the paths 140. As will be described using FIG. 5, source device 110 may also implement example process 200 in FIG. 2. The purpose is to determine a reverse PMTU for second path 140-2 (e.g., RPMTU(S, D)=PMTU(D, S)=600 bytes) such that packets for transmission from destination device 120 to source device 110 may be sized accordingly. In the example in FIGS. 5, 510 to 530 may be implemented during one session (e.g., an earlier "first TCP session"); 540 to 576 during the establishment of another session (e.g., a later "second TCP session"); and 580 to 586 after the session establishment is completed. In practice, any other suitable implementation may be used, such as performing 510 to 586 over a single session, or during additional and/or alternative session, provided it is supported by the protocol used.

Figure 5:
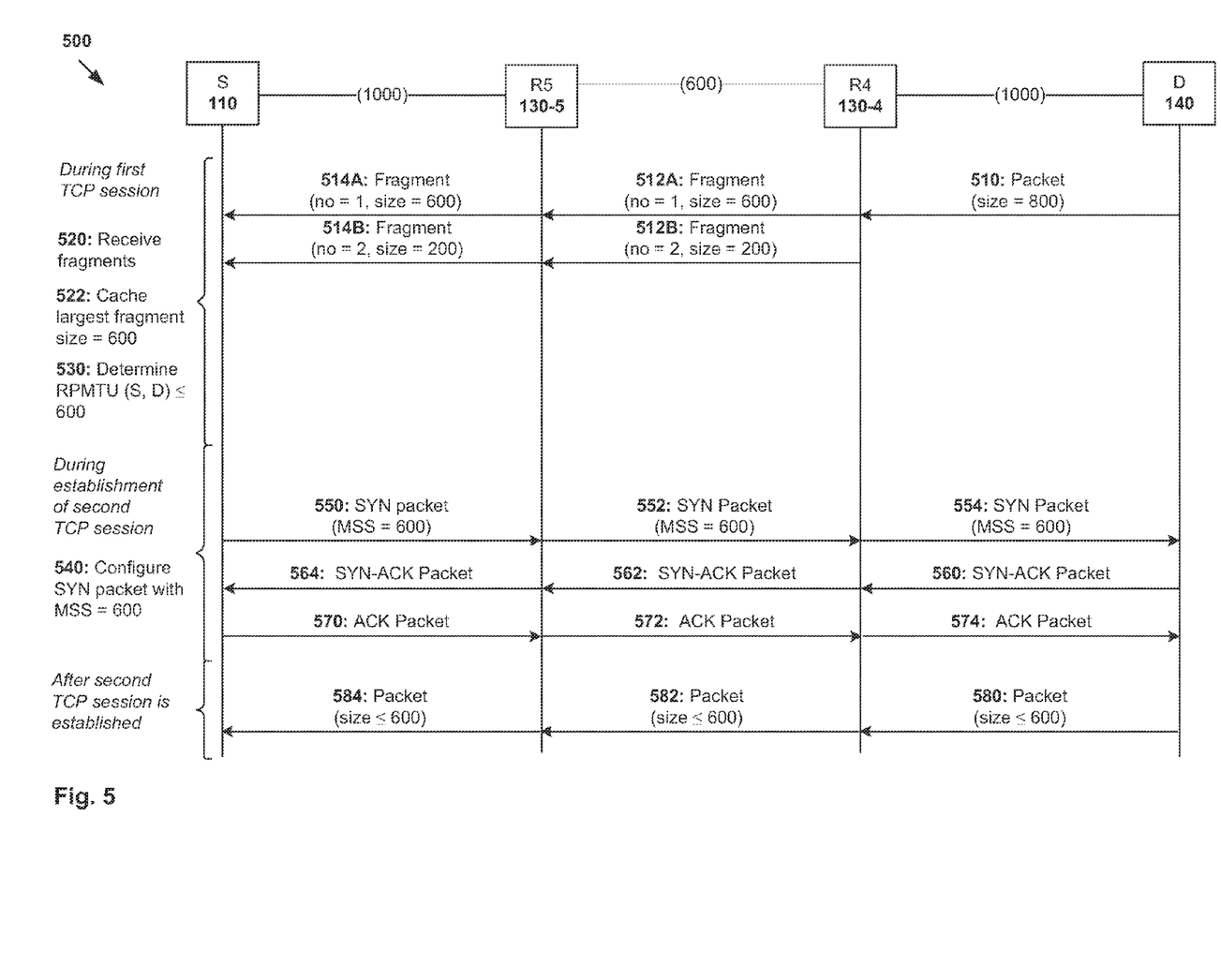
FIG. 5 is a flow diagram illustrating example communication in the example network environment in FIG. 1 when the example process in FIG. 2 is implemented by a source device.

FIG. 5 is a flow diagram illustrating example communication 500 in example network environment 100 in FIG. 1 when example process 200 in FIG. 2 is implemented by source device 110. In this example, the implementation is illustrated using one or more operations, functions, or actions represented by 510 to 584. The various operations, functions, or actions may be combined, divided, and/or eliminated based upon the desired implementation.

At 510 to 516C in FIG. 5 (related to block 205 in FIG. 2), destination device 120 sends one or more packets to source device 110 via intermediate devices 130 (i.e., R4 and R5) along second path 140-2. Similar to the example in FIG. 4, the packets (one shown for simplicity) may be sent from destination device 120 to source device 110 for any suitable purpose (e.g., UDP datagrams, ICMP packets or TCP packets with DF flag=0).

In the example in FIG. 5, fragmentation is required at R4 because the size of the packet (i.e., 800 bytes) is greater than the next hop LMTU (i.e., LMTU(R4, R5)=600 bytes). As such, R4 fragments each packet 510 into two fragments not exceeding 600 bytes each, i.e., first fragment 512A (fragment number n=1, size=600 bytes) and second fragment 512B (n=2, size=200 bytes). At R5, fragmentation is not required because the size of each fragment is less than the next hop LMTU (i.e., LMTU(R5, S)=1000 bytes). At 514A and 514B, R5 sends the two fragments to source device 110.

At 520 in FIG. 5 (related to block 210 in FIG. 2), source device 110 receives two fragments from R5. Next, at 522, source device 110 may determine the largest fragment size (n=1, size=600 bytes) and cache the value accordingly. Source device 110 may continue to receive packets and/or fragments from destination device 120 over a suitable period of time (e.g., an hour, etc.) to update the cached size accordingly.

At 530 in FIG. 5 (related to block 220 in FIG. 2), source device 110 determines a reverse PMTU for second path 140-2 based on the received fragments. For example, the reverse PMTU may be determined as less than or equal to the cached largest fragment size (e.g., RPMTU(D, S)=600 bytes).

At 540 in FIG. 5 (related to block 230 in FIG. 2), source device 110 configures message 160, such as during the establishment of a connection-oriented session with destination device 120. In the case of TCP, source device 110 may configure a SYN packet (i.e., SYN flag=1 at 340 in FIG. 3) that includes an MSS parameter relating to the reverse PMTU (see 370 in FIG. 3). In the example in FIG. 5, the MSS parameter is set RPMTU(D, S)=600 bytes, which is also the actual PMTU of second path 140-2.

At 550 to 554 in FIG. 5 (related to block 240 in FIG. 2) source device 110 sends message 160 to destination device 120. Similar to the example in FIG. 4, the SYN packet is to inform destination device 120 to size its packets based on the MSS parameter (e.g., 600 bytes). As part of the three-way handshake process, destination device 120 may respond with a SYN-ACK packet (see 560 to 566 in FIG. 5) and source device 110 with an ACK packet (see 570 to 576 in FIG. 5) to complete the session establishment.

At 580 to 584 in FIG. 5, after the connection-oriented session is established, destination device 120 sends packets with size less than or equal to the MSS parameter (i.e., 600 bytes) to source device 110. This reduces the likelihood of, if not avoids, fragmentation at intermediate devices R4 and R5. Then at source device 110, any overhead associated with the buffering and reassembly of fragments may be reduced or avoided.

As discussed with reference to FIG. 4, source device 110 may repeat 520, 522 and 530 to determine and update the reverse PMTU based on any updates to the cached largest fragment size, for example due to changes to second path 140-2. Similar to the example in FIG. 4, the reverse PMTU determined by source device 110 may be less than or greater than the actual PMTU of second path 140-2. In the case of RPMTU(S, D)<PMTU(D, S)=600 bytes, destination device 120 will send smaller packets than what its PMTU can support. In the case of RPMTU(S, D)>PMTU(D, S)=600 bytes, fragmentation may continue to occur until destination device 120 reduces the size of its packets. Again, any potentially negative impact of these situations is generally not long lasting if the reverse PMTU is updated from time to time to improve the performance in a subsequent session.

TCP Fast Open

Although TCP has been used as an example in FIG. 4 and FIG. 5, it will be appreciated that any other suitable protocol may be used. For example, newer techniques such as TCP Fast Open may be used to speed up the connection establishment process to facilitate early data exchanges. Such techniques are designed for short duration connections, which also stand to benefit from example process 200 because the reverse PMTU helps to reduce fragmentation and mitigate packet loss.

Figure 6:
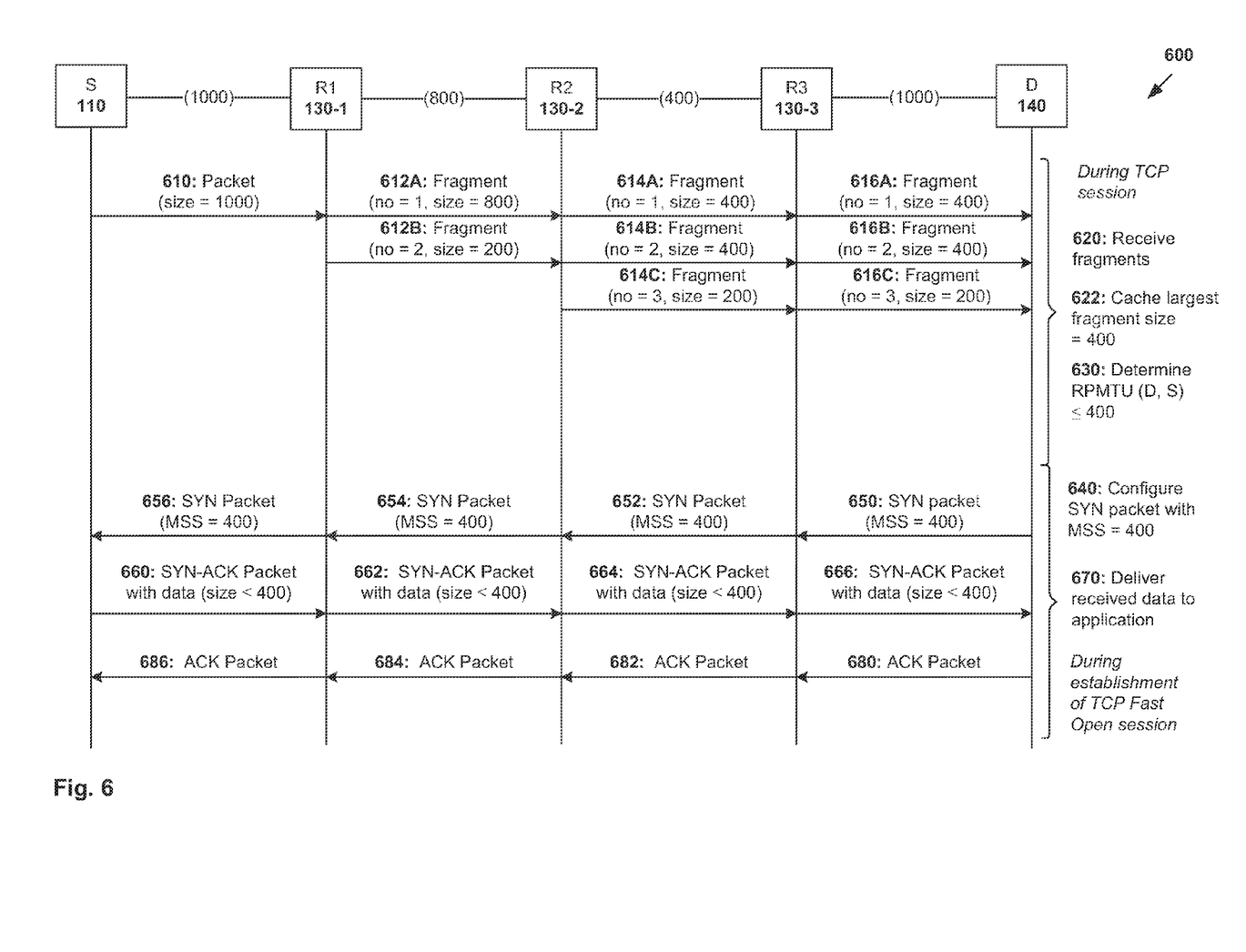
FIG. 6 is a flow diagram illustrating example communication using Transport Control Protocol (TCP) Fast Open in the example network environment in FIG. 1 when the example process in FIG. 2 is implemented by a destination device.

FIG. 6 is a flow diagram illustrating example communication 600 using TCP Fast Open in network environment 100 in FIG. 1 when example process 200 in FIG. 2 is implemented by destination device 120. FIG. 6 is similar to the example in FIG. 4, in that 610 to 616C correspond with 410 to 416C respectively, and 620 to 640 with 410 to 440 respectively. The difference, however, lies in the early data transmission from source device 110 to an application at destination device 120 during the initial handshake process at 660 to 666 and 670.

In particular, although both regular TCP and TCP Fast Open generally allow transmission of data as part of the SYN, SYN-ACK or ACK packets, regular TCP (e.g., in the examples in FIG. 4 and FIG. 5) does not deliver to the application at destination device 120 before the handshake completes. By contrast, when TCP Fast Open is in used, any data received by TCP at destination device 120 will be delivered to the relevant application before the handshake completes.

In the example in FIG. 6, source device 110 may start sending data to destination device 120 by including the data in the SYN-ACK packet (see 660 to 666) but before the ACK packet is received (see 680 to 686). Further, destination device 120 may deliver data in the SYN-ACK packet to the application (see 670) before responding with the ACK packet (see 680 to 688). This eliminates the need to wait for the completion of a three-way handshake before sending data, therefore reducing one round-trip time of delay for each connection.

Using example process 200, the reverse RPMTU that is determined based on cached values of a previous session (e.g., 610 to 616C) may be used to reduce the likelihood of fragmentation in a new session (e.g., 680 to 686). This further reduces packet loss and improves data latency in applications that only require short TCP sessions (e.g., web browsing applications, etc.). Although TCP Fast Open has been described in FIG. 6 with reference to the example in FIG. 4 (i.e., destination device 120 performing reverse PMTU discovery), it will be appreciated that it may also be applied to the example in FIG. 5 (i.e., source device 110 performing reverse PMTU discovery).

In the example in FIGS. 6, 610 to 630 may be implemented during one session (e.g., an earlier "TCP session"); 640 to 686 during the establishment of another session (e.g., a later "TCP Fast Open session"). In practice, any other suitable implementation may be used, provided it is supported by the protocol used.

The above examples can be implemented by hardware (including hardware logic circuitry), software or firmware or a combination thereof. For example, source device 110, destination device 120 and intermediate device 130 may be implemented by any suitable network device, which may include processor and memory that may communicate with each other via a bus, etc. The network device may include a non-transitory computer-readable medium having stored thereon instructions that, when executed by the processor, cause the processor to perform processes described herein with reference to FIG. 1 to FIG. 6.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a computer-readable storage medium includes recordable/non recordable media (e.g., read-only memory (ROM), random access memory (RAM), magnetic disk storage media, optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

I claim:

1. A method for a first device to perform reverse path maximum transmission unit (PMTU) discovery in a communications network, comprising:
    receiving multiple fragments of a packet sent by a second device via a path from the second device to the first device in the communications network;
    based on the received fragments, determining a reverse PMTU that represents an estimate of a PMTU of the path from the second device to the first device;
    configuring a message that includes data relating to the reverse PMTU; and
    sending, to the second device, the message to inform the second device to size packets for transmission from the second device to the first device based on the data relating to the reverse PMTU.

2. The method of claim 1, wherein the fragments are received in a first connection-oriented session between the first device and the second device; and configuring the message that includes the data relating to the reverse PMTU comprises:
    configuring the message in the form of a session establishment message that includes the data relating to the reverse PMTU during an establishment of a second connection-oriented session between the first device and the second device.

3. The method of claim 2, wherein the session establishment message is a Synchronize (SYN) packet that initiates the establishment of the second connection-oriented session.

4. The method of claim 3, wherein configuring the session establishment message comprises setting a maximum segment size (MSS) parameter of the SYN packet to be less than or equal to the reverse PMTU.

5. The method of claim 3, wherein the second connection-oriented session is a Transport Control Protocol (TCP) session or a TCP Fast Open session.

6. The method of claim 1, wherein determining the reverse PMTU comprises:
    determining a largest fragment size based on the received fragments;
    caching the largest fragment size over a period of time; and
    setting the reverse PMTU to be less than or equal to the cached largest fragment size.

7. The method of claim 6, determining the reverse PMTU comprises:
    in response to receiving further fragments from the second device, updating the cached largest fragment size; and
    based on the updated cached largest fragment size, determining an updated reverse PMTU for the second device to size further packets based on the updated reverse PMTU.

8. The method of claim 1, wherein the first device is a destination device or receiving endpoint (REP) device, and the second device is a source device or sending endpoint (SEP) device in the communications network.

9. A non-transitory computer-readable storage medium that includes a set of instructions which, in response to execution by a processor of a first device, cause the processor to perform a method of reverse path maximum transmission unit (PMTU) discovery in a communications network, the method comprising:
    receiving multiple fragments of a packet sent by a second device via a path from the second device to the first device in the communications network;
    based on the received fragments, determining a reverse PMTU that represents an estimate of a PMTU of the path from the second device to the first device;
    configuring a message that includes data relating to the reverse PMTU; and
    sending, to the second device, the message to inform the second device to size packets for transmission from the second device to the first device based on the data relating to the reverse PMTU.

10. The non-transitory computer-readable storage medium of claim 9, wherein the fragments are received in a first connection-oriented session between the first device and the second device; and configuring the message that includes the data relating to the reverse PMTU comprises:

configuring the message in the form of a session establishment message that includes the data relating to the reverse PMTU during an establishment of a second connection-oriented session between the first device and the second device.

11. The non-transitory computer-readable storage medium of claim 10, wherein the session establishment message is a Synchronize (SYN) packet that initiates the establishment of the second connection-oriented session.

12. The non-transitory computer-readable storage medium of claim 11, wherein configuring the session establishment message comprises setting a maximum segment size (MSS) parameter of the SYN packet to be less than or equal to the reverse PMTU.

13. The non-transitory computer-readable storage medium of claim 11, wherein the second connection-oriented session is a Transport Control Protocol (TCP) session or a TCP Fast Open session.

14. The non-transitory computer-readable storage medium of claim 9, wherein determining the reverse PMTU comprises:

determining a largest fragment size based on the received fragments;

caching the largest fragment size over a period of time; and setting the reverse PMTU to be less than or equal to the cached largest fragment size.

15. The non-transitory computer-readable storage medium of claim 14, determining the reverse PMTU comprises:

in response to receiving further fragments from the second device, updating the cached largest fragment size; and based on the updated cached largest fragment size, determining an updated reverse PMTU for the second device to size further packets based on the updated reverse PMTU.

16. The non-transitory computer-readable storage medium of claim 9, wherein the first device is a destination device or receiving endpoint (REP) device, and the second device is a source device or sending endpoint (SEP) device in the communications network.

17. A device configured to perform reverse path maximum transmission unit (PMTU) discovery in a communications network, the device being a first device and comprising:

a processor; and a non-transitory computer-readable medium having stored thereon instructions that, when executed by the processor, cause the processor to:

receive multiple fragments of a packet sent by a second device via a path from the second device to the first device in the communications network;

based on the received fragments, determine a reverse PMTU that represents an estimate of a PMTU of the path from the second device to the first device;

configure a message that includes data relating to the reverse PMTU; and send, to the second device, the message to inform the second device to size packets for transmission from the second device to the first device based on the data relating to the reverse PMTU.

18. The device of claim 17, wherein:

instructions for receiving the fragments cause the processor to: receive the fragments during a first connection-oriented session between the first device and the second device; and instructions for configuring the message that includes the data relating to the reverse PMTU cause the processor to: configure the message in the form of a session establishment message that includes the data relating to the reverse PMTU during an establishment of a second connection-oriented session between the first device and the second device.

19. The device of claim 18, wherein the second connection-oriented session is a Transport Control Protocol (TCP) session or a TCP Fast Open session, the session establishment message is a Synchronize (SYN) packet, and instructions for configuring the session establishment message cause the processor to:

set a maximum segment size (MSS) parameter of the SYN packet to be less than or equal to the reverse PMTU.

20. The device of claim 17, wherein instructions for determining the reverse PMTU cause the processor to:

determine a largest fragment size based on the received fragments;

cache the largest fragment size over a period of time; and set the reverse PMTU to be less than or equal to the cached largest fragment size.

* * * * *